Dec. 30, 1941.    J. A. H. BARKEIJ    2,268,370
INNER TUBE WITH MULTIPLE AIR CHAMBERS FOR PNEUMATIC TIRES
Filed Sept. 24, 1938    3 Sheets-Sheet 1
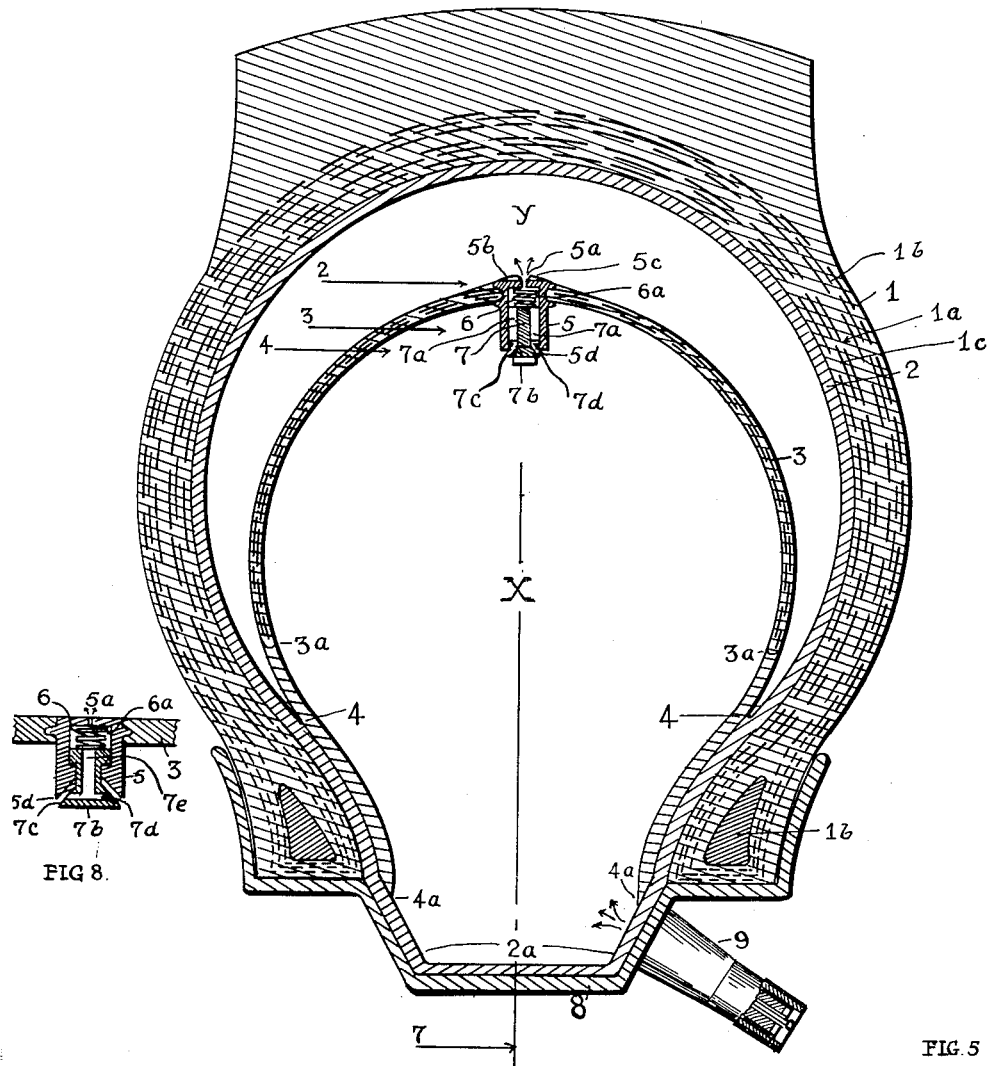
INVENTOR.
J. A. H. Barkeij Dec. 30, 1941.  J. A. H. BARKEIJ  2,268,370
INNER TUBE WITH MULTIPLE AIR CHAMBERS FOR PNEUMATIC TIRES
Filed Sept. 24, 1938  3 Sheets-Sheet 2

INVENTOR.
J.A.H.Barkeij

Dec. 30, 1941.   J. A. H. BARKEIJ   2,268,370
INNER TUBE WITH MULTIPLE AIR CHAMBERS FOR PNEUMATIC TIRES
Filed Sept. 24, 1938   3 Sheets-Sheet 3
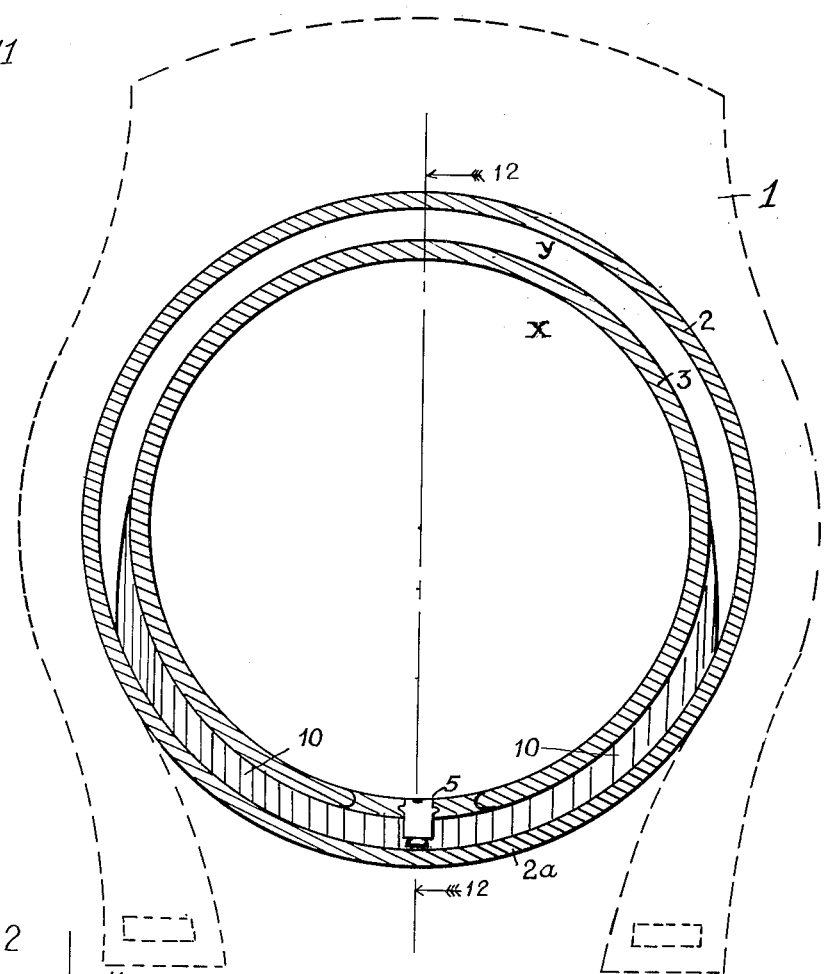
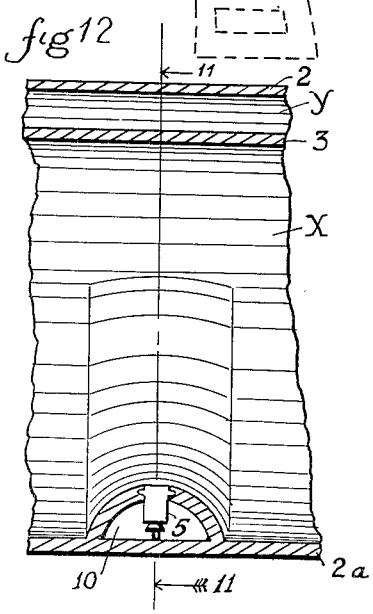
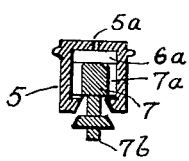
Inventor
J. A. H. Barkeij Patented Dec. 30, 1941

2,268,370

UNITED STATES PATENT OFFICE 2,268,370

INNER TUBE WITH MULTIPLE AIR CHAMBERS FOR PNEUMATIC TIRES

Jean A. H. Barkeij, Altadena, Calif.

Application September 24, 1938, Serial No. 231,553

8 Claims. (Cl. 152—342)

My invention relates in general to the multiple air-chamber-inner tube for pneumatic tires, and in particular to that type thereof in which the outer air chamber envelops the inner air chamber with more than a crescent moon-shaped outer chamber so that the two air chambers have a single intermediate wall and another wall in common between the beads of the tire, adjacent to that part of the rim, which is called the drop-center rim. My general object is to construct a tube and tire which may be continued in use for a considerable time after a blowout has taken place in the outer air chamber.

My second object is to inflate both air chambers with a single standard inflation valve, connected to the inner air chamber and to transfer the inflation air and inflation pressure through another valve located in the intermediate wall between the two chambers, to the outer air chamber. This second valve is normally open but closes under centrifugal force when the tube is rolling inside a wheel on a vehicle. A spring tends to keep this latter valve open when the tire is at rest and not rolling so that the centrifugal force stops. This spring under certain condition is not imperative, as we will see.

My third object is to construct said second valve in a unit, which may be vulcanised in the intermediate wall of the tube so that it forms one non-leaking unit therewith, and to locate it preferably on the outermost periphery of the intermediate wall, although it may be interposed between the two air chambers at any place between the two as for instance near or inside the drop center of the rim, see Fig. 7.

My fourth object is to construct the intermediate wall partly of rubber with canvas in it and partly of stretchable rubber so that when the outer air chamber has blown out the inner air chamber may expand to the inside diameter of the inner surface of the outer tube of the outer air chamber, as we will see later. Another variety shown in Figs. 9 and 10 shows that the entire tube may be made of rubber, provided the inner tube has a thickness exceeding that of the outer.

My fifth object is to provide the outer surface of said second intermediate valve so that it has grooves adjacent the opening thereof and so that, when the tire or rather tube is inflated with compressed air, the air from the inner air chamber will always be able to flow into the outer air chamber, even if the second valve 5 is pressed on the inside of the outer air chamber.

My sixth object is to construct the second valve with a minimum of parts and as simple and cheap to manufacture as possible. It is constructed of a hollow shell having a central opening at one end, a spring inside the shell resting around said outer central opening, a central piston resting on said spring having a multiplicity of air passages on its circumference. This piston rests with an extension on a valve seat constructed on the inner end of the shell. A stem extends from the piston body through the central hole of the valve seat, and preferably a rubber valve is constructed on the said stem, as shown in detail in the figures.

My seventh object is to construct two of such valves diametrically opposite each other in order to balance the tube, tire and wheel, or to use one of such valves only and to counterbalance such a single valve with a similar button of equal weight diametrically opposite such a single valve and at the same distance from the center of such tube, tire and wheel.

My eighth object is to construct said tube of two parts, one being a complete circle, in lateral section and the other part of a circle.

Other objects will appear hereinafter when discussing the following figures, as for instance a carcass of a tire which forms with the present tube an unbreakable and unitary invention.

In the accompanying drawings, Fig. 1 is a vertical transverse sectional view through a tire and tube constructed in accordance with the general purpose mentioned, the same being shown on a rim.

Fig. 2 shows the top view of the valve in the wall intermediate the two air chambers, showing grooves to insure the transfer of air from the inner tube to the outer tube.

Fig. 3 shows a cross section of the valve 5 of Fig. 1 on the horizontal section line 3.

Fig. 4 shows a cross section of the rubber valve on the stem of the piston of valve 5 in Fig. 1 on the horizontal section line 4.

Fig. 5 shows the mounting of two valves diametrically opposite each other on the same tube, or the mounting of one valve and an equivalent button diametrically opposite such valve on the same tube.

Fig. 6 shows a modification of valve 5 of Fig. 1 in which a spring is placed on the other end of the piston in the valve.

Fig. 7 shows valve 5 in a position near the rim of the wheel. Similar reference numbers or characters indicate corresponding parts throughout the several views in the drawings.

Fig. 8 shows another modification of valve 5 having the air-passage centrally in the piston, in the shell.

Figure 9:
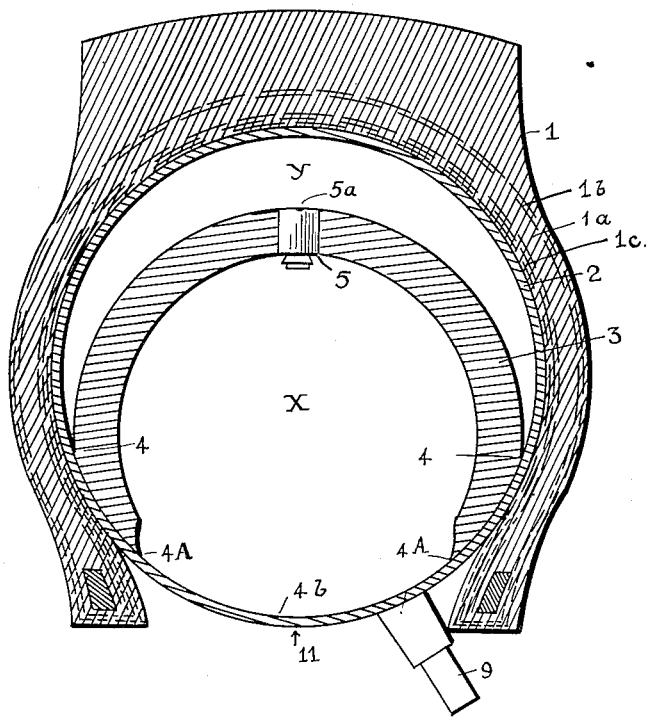
Figure 10:
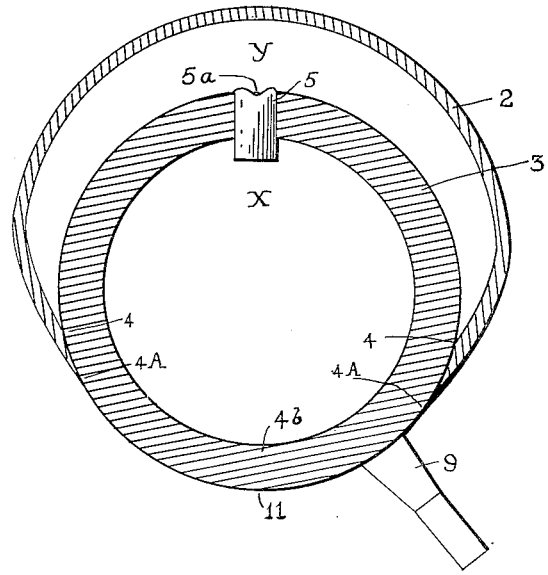

Figs. 9 and 10 on the second sheet shows modifications of the tube showing the inner tube with much increased wall-thickness, and able to withstand the inner air pressure without the outer carcass.

Fig. 11 shows the by-pass or under-passage 10 of Fig. 7, in full in cross-section. Fig. 11 shows Fig. 12 on the section line 12—12.

Fig. 12 shows Fig. 11 on the section line 2—2.

Fig. 13 shows the transfer valve of Fig. 1 without a spring.

Referring to the drawings in detail, the number 1 designates the carcass of a pneumatic tire, mounted on a drop center rim 8. 2 indicates the wall of the outer air chamber Y, and 3 indicates the wall of the inner air chamber, which is vulcanised on the inside surface of the wall 2 from point 4 to point 4a approximately.

It is preferred to construct the upper part of the wall 3 of nonstretchable material, but the part below the point 3a from pure rubber, so that the inner air chamber may stretch upon expansion to the inside diameter of the tire or casing.

A standard inflation valve 9 is attached to that part of the inner tube located between the beads of the tire as in standard construction for standard tubes.

In the intermediate wall 3 between the two air chambers I construct a valve composed of three parts, a shell 5, a piston 7 inside the shell carrying a rubber valve seat 7c fastened to the piston 7 by means of a screw 7b. The piston 7 is provided with holes 7a on the periphery thereof and a spring 6 has the tendency to keep the valve seat 7c away from the valve seat 5d on the lower part of the shell 5, so that the air may readily flow from chamber X to chamber Y, through passage 7d.

However, under the tendency of centrifugal force, when the vehicle and tube rotate at any speed from 5 or ten miles upward, the weight of the piston 7 compresses the spring 6 so that the valve 7c comes to seat on the valve seat 5d, and the passage 7d between chambers Y and X is closed.

Inflation, however, always takes place when the vehicle and tire is at rest, and in that case the spring 6 opens the valve so that the air pressure introduced in chamber X through valve 9, readily propagates through valve to chamber Y.

In case the tire 1 wears out and has a blowout, the pressure in chamber Y decreases suddenly and even if the centrifugal force had not yet seated the valve seats 7c and 5d tight upon each other, the sudden decrease of pressure on one side of the intermediate wall tends to press these valve seats tight upon each other so that no air can escape from the inner tube after a blow out of the outer tube. Therefore the tire does not deflate entirely but prevents the car from a dangerous swerve on account of the lowering of the car on that side where a tire blows out. Besides, the driver of the car after a blow out does not have to jack the car up, but can conveniently reach the next garage or oil station. If a great distance has to be driven, the tire can be pumped up by a few strokes.

A car is practically never driven continuously at such a high speed that the pressures in the two air chambers would differ appreciably by leakage unless a puncture takes place in the outer air chamber, and unless a cold tire is driven suddenly at high speed on a hot surface, so that the outer air chamber heats up immediately. Every time the car stops or decreases speed below the limit that the valve opens, the pressure in the two air chambers is equalised, on account of the spring 6a forcing the valve open, so that the tube can be immediately pumped up.

It stands to reason that this valve may be executed in different ways. In Fig. 1 the piston 7 closes a valve below the spring 6 and in Fig. 6 I have shown a modification, in which the valve seats are on top of the piston and the spring 6 is below the piston. Other variations of these two types can be easily conceived and are supposed to fall under the scope of this invention. See Fig. 8.

The upper part of the valve is preferably made so that grooves 5c are located at the mouth of the central opening 5a therein, so that when the tire is inflated when there is a load on it, the air can always seep from the valve into the chamber Y. Fig. 2 shows clearly these grooves 5c leading from the opening 5a.

Another important point is to make the exit 5a small and the valve opening 7d between the valve seats 7c and 5d substantially greater. When inflating the valve the pressure created in chamber X propagates immediately into the shell through the holes 7a of the piston 7 but does escape therefrom through the exit 5a at the same rate as it comes in. Therefore the pressure on both sides of the valve 7c remains the same and there is no tendency for the valve to close.

In Fig. 8 I show a modified valve in which the air passage 7e is made centrally in the piston. The exit passage 5a and spring are similarly located as in Fig. 1. The valve has air passages 7d in its valve seat 7c so that when the valve 7b seats under centrifugal force the passage 7e is closed because the passages 7d are closed by the valve seats 7c and 5d seating on each other. Likewise here a spring 6 may be used or not, as explained.

Likewise here, it is preferred to make the passage 5a small when no spring is used because when the passages 7d and 7e are substantially greater it stands to reason that the pressure in chamber 6a in the shell 5 has as much pressure as the chamber X and the valve 7b has no tendency to seat. After the pressures in chambers Y and X are equalised the pressure in chamber 6a will be as great as in chamber Y.

This type of tube is closely related to the tire shown in Fig. 1, in which the two layers of canvas 1b and 1c are separated from each other by a layer of live rubber 1a. This construction is in and by itself of importance, because it makes a tire of a given number of layers of canvas more supple and gives it greater endurance against heat and wear. The layers of canvas are distorted by bending and the inner layers suffer more in that respect than the others. The layer of rubber in between allows the inner layers to cushion their deflection on the intermediate layer of rubber indicated at 1a, and their compression is reduced. Under flection the outer layers have a tendency to stretch and the inner layers to compress and the layer 1a helps both layers in their predicament.

In Fig. 5 I show that two valves may be placed in the intermediate wall 3 diametrically opposite each other in order to balance the wheel. If it is preferred to use only one valve and to counterweigh it with a button of similar weight in the same position, this will be all right with me too.

It is even possible to construct the spring 6 and piston 7 so that the spring pressure is just sufficient to keep the valve open if the air is introduced in the inner chamber under inflation keeping the valve seats in such a position that when inflation ceases there is still enough communication between the two air chambers past said valve seats to equalise the pressure therein. However when the air pressure suddenly and totally vanishes from the outer chamber the inside pressure will suddenly seat the valve 7c tight on seat 5d, independent even of the centrifugal force.

It is likewise understood that the inverted valve of Fig. 7 may be likewise used in the position of the transfer valve as shown in Figs. 1, 9, 10, but in inverted position, because the stretchable part from 3a to 4 in the wall 3 of Fig. 1, enables the inner tube 3 to expand in exactly the same way as the stretchable portion shown in Figs. 7, 11 and 12 closer to the rim of the tire. If the outer tube blows out, the inner tube or air chamber may expand notwithstanding the non-stretchable or non-flexible part from 3a to 3a in Fig. 1. The stem of the valve 7b has to travel likewise a short distance in order to reach the interior of the tube 2 and substantially the same effect would be obtained as in the modification of Fig. 7 and Figs. 11 and 12. Likewise in such a position the advantage of the small passage 5a would allow the driver always to bring the car to a safe stop at the highest speed, because the expansion of the tube 3 would take place so fast that the internal pressure would be sufficient to force the valve 7c with stem 7b against the outer tube 2.

Likewise the transfer valve can be applied in inverted position in the modifications of Figs. 9 and 10 (showing them in upright positions as shown in Fig. 1) because the thick intermediate wall may expand there just as readily as in the modification of Fig. 1, because the curved intermediate wall 3 is made entirely of rubber. Likewise here the relatively close position of the wall 3 to the interior of wall 2, is an imperative part of the construction, because the valve 7c has to close readily the transfer passage 7d and the time to reach said position cannot be too great otherwise too much pressure is lost from a volume already reduced by that in chamber Y. Finally I will discuss Figs. 9 and 10.

For instance the wall of the inner tube can be made entirely of stretchable material, for instance of rubber and of such a thickness and toughness that the pressure inside the inner tube may expand it, but will not be sufficient to force the inner tube through the hole in the casing made by the blow-out.

It is further understood that a blown-out tire may be inflated out of a spare tire carried in every car, which can be inflated for that purpose above the normal charge. When a tire sags, when riding on the inner tube 3 still in inflated condition, it pays to increase the pressure therein to approximate the standard pressure therein in order to save the tire, if it is worth saving. In most cases a blown out tire is no good any more and even if it has to be driven in a flattened state for quite a distance, no economic loss is suffered anyway.

It is further understood that the spring 6 in valve 5 can be omitted provided the tire is initially inflated in such a position that the valve hangs down and opens under gravity force. When the inflation air enters in the inner tube it will not raise the valve seat 7c against the valve seat 5d. After the tire is inflated it may be rolled because the pressure is now equal on both sides and at low speeds the piston 7 may move up and down in the shell under gravity force. However, as soon as the centrifugal force is greater than the gravity force, these seats 7c and 5d will stay on each other continuously until the speed of the vehicle falls again under this minimum. In the meantime the difference in pressure even when fully inflated, both, will not be enough to keep the valve closed, when the tire is rolled in such a position that the valve hangs. In order to be freed of the trouble to watch the position of the tire every time it has to be inflated, it is preferred to use a spring 6 to keep it open in any position the tire is rolled. The valve seats may be made of metal so that a very slow leakage may take place all the time.

Fig. 11 shows the form and location of the by-pass 10 of Fig. 7 in full cross-section. The outer and inner air chamber are drawn in the state when they are not inflated. When the two air chambers are inflated, they expand towards the rim, and change their form and shape accordingly. When the chamber Y collapses, the valve 5 is closed by the pressure in chamber X.

Fig. 12 shows the by-pass 10 on the section line 12—12 of Fig. 11.

Fig. 13 shows the transfer valve of Fig. 1 without a spring, as could be applied on the inverted position of the valve 5 in Fig. 11.

Figs. 9 and 10 show modifications of the tube as proposed in my application No. 71,224. The type of Fig. 9 is in fact composed of a thin outer tube 2 vulcanised in the middle at the point 4b. The inner tube is attached or vulcanised to the outer tube from 4 to point 4A. The outer tube is thin at the inner periphery where it sinks into the drop center of the rim 8 as shown in Fig. 1.

Likewise in the type of Fig. 10 the inner tube 3 is vulcanised in the middle at point 11. The outer tube 3 is vulcanised here reversely to the inner tube.

The type of Fig. 9, when expanding fits the rim part of the wheel more readily than the type of Fig. 10, because the thickness of the wall of the latter type is equally heavy at the inner periphery.

The main purpose of these three types of inner tubes is, however, the same and unitary. For that reason I construct my tire, the casing I mean, of two layers of canvas the outer one 1b of one layer, or at the most two, and the inner layer 1c with 3, 4, or 5 layers of canvas separated as indicated in Figs. 1 and 9 by a layer 1a of live rubber. If the driver wears out his tire so that the first layer of canvas appears and eventually the second layer, he is satisfied that he got everything practically out of his tire. The advantage of such a tire lies, however, in the tube, because it protects the people against any blow-out of a 3 or 4 ply tire and the total of plies can be therefore 4 or 5 or at the very most 6, and you have the same safety as a standard 4, 5, 6, 7, 8-ply tire. People can retread their tires several times and finally, even if the inner tubes are somewhat expensive compared with standard one chamber tubes, yet, in combination they are cheaper to use if you make it a good habit to retread your tires.

The tubes of Figs. 9 and 10 have further the advantage that ordinary punctures will be limited to the outer air chamber making repair cheap, not only, but you can drive your car without a change of wheel to the repair man in case of puncture and blow-out alike. Therefore the particular construction of the tube and that of the tire are closely related and form one useful unit.

I claim:

1. A tube for pneumatic tires having an outer and inner air chamber, a curved intermediate wall between the two air chambers, a valve structure in said latter wall composed of two parts, a shell and a piston located in said shell, said shell having an entry and exit passage respectively located in the inner and outer tube said shell being otherwise closed, and said piston located between said exit and entry passage, said piston associated with a valve closing said entry passage, and said exit passage being substantially smaller than said entry passage.

2. A tube for pneumatic tires having an outer and inner air chamber, said inner air chamber being partially formed by a curved intermediate wall located between the said two air chambers, said curved wall being substantially closer to the outer periphery of said outer tube than to the inner periphery of the inner tube, a passage in said wall between said two air chambers an inflation valve for the inner chamber, a piston in said passage located between the two open ends of said passage, said piston associated with a valve closing said passage when the pressure in said outer air chamber is suddenly appreciably decreased.

3. A tube for pneumatic tires having two air chambers, a wall intermediate said two air chambers and an inflation valve for one of said air chambers, a valve-structure in said wall having a passage therein having an entry in one of said chambers and an exit in the other chamber, piston between the two ends of said passage, being otherwise closed, actuating a valve closing and opening said passage, said piston passing the inflation air from the chamber having the inflation valve to the other chamber and between said piston and the wall of said passage the exit of said passage being smaller than the entry passage.

4. The combination of claim 3, in which said valve closes the inner end of said passage in said inner air chamber.

5. The combination of claim 3, in which a spring between said piston and said structure tends to keep said valve open during inflation.

6. The combination of claim 3, in which a spring between said actuator and said structure tends to keep the valve open during inflation and when the tube is rotating at high speed resisting the centrifugal force tending to close said valve.

7. A tube for pneumatic tires mounted on rims, having two air chambers and an intermediate wall between said two air chambers, an inflation valve for one of said air chambers and a transfer valve in said intermediate wall to transfer the inflation fluid to the other air chamber, said intermediate wall having a flexible portion adjacent the rim of the tire on its inner periphery, said transfer valve adapted to be closed by the sudden deflation of only one of said air chambers and adapted to be held closed upon sudden deflation of said air chamber by expanding said flexible portion towards the rim of the tire, closing thereby said transfer valve by engagement of a valve in said transfer valve with that portion of the tube which is adjacent the rim.

8. A tube for pneumatic tires mounted on rims, having two air chambers, an outer and inner one and an intermediate wall therebetween, said outer air chamber having substantially the shape of a crescent moon in cross-section and the inner one substantially a circular shape, a communicating passage under said inner air chamber to connect the two ends of said crescent-moon-shaped outer air chamber, the roof of said passage being made of elastic and flexible material.

JEAN A. H. BARKEIJ.